United States Patent
Ahuja et al.

(10) Patent No.: US 10,331,659 B2
(45) Date of Patent: Jun. 25, 2019

(54) AUTOMATIC DETECTION AND CLEANSING OF ERRONEOUS CONCEPTS IN AN AGGREGATED KNOWLEDGE BASE

(71) Applicant: International Business Machines Corporation, Armonk, NY (US)

(72) Inventors: Shilpi Ahuja, San Jose, CA (US); Sheng Hua Bao, San Jose, CA (US); Rashmi Gangadharaiah, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 303 days.

(21) Appl. No.: 15/257,266

(22) Filed: Sep. 6, 2016

(65) Prior Publication Data

US 2018/0067981 A1    Mar. 8, 2018

(51) Int. Cl.

| | |
|---|---|
| *G06F 16/23* | (2019.01) |
| *G06F 16/215* | (2019.01) |
| *G06F 16/28* | (2019.01) |
| *G06F 16/901* | (2019.01) |
| *G06F 17/27* | (2006.01) |

(52) U.S. Cl.
CPC ........ *G06F 16/2365* (2019.01); *G06F 16/215* (2019.01); *G06F 16/285* (2019.01); *G06F 16/9024* (2019.01); *G06F 17/27* (2013.01)

(58) Field of Classification Search
CPC ............ G06F 17/30684; G06F 17/277; G06F 17/5009; G06F 19/12; G06F 19/26; G06F 19/28; G06F 2217/10; G06F 17/241; G06F 17/27; G06F 17/28; G06F 17/30289; G06F 8/20; G06F 8/30; G06F 11/2094; G06F 17/271; G06F 17/2785; G06F 17/30327; G06F 17/30575; G06F 17/30864;

(Continued)

(56) References Cited

U.S. PATENT DOCUMENTS

| 7,152,065 B2 | 12/2006 | Behrens et al. |
| 7,430,504 B2 | 9/2008 | Vanderwende et al. |

(Continued)

OTHER PUBLICATIONS

"Database Cleanup utility command script", IBM Corporation, https://www.ibm.com/support/knowledgecenter/SSZLC2_7.0.0/com.ibm.commerce.admin.doc/refs/rducommand.htm, retrieved online Jun. 14, 2016, 2 pages.

(Continued)

*Primary Examiner* — Shyue Jiunn Hwa
(74) *Attorney, Agent, or Firm* — Francis Lammes; Stephen J. Walder, Jr.; Reza Sarbakheh

(57) ABSTRACT

A mechanism is provided for automatically detecting and cleansing erroneous concepts in an aggregated knowledge base. A graph data structure representing the concept present in a portion of the natural language content is generated. The graph data structure is analyzed to determine whether or not the graph data structure comprises one or more concept conflicts in association with a set of nodes in the graph data structure, the one or more concept conflicts are associated with the set of nodes if two or more nodes represent separate and distinct concepts. Responsive to determining that there are one or more concept conflicts due to there being two or more nodes representing separate and distinct concepts, the two or more nodes are split into separate distinct concepts within the knowledge base.

20 Claims, 5 Drawing Sheets

(58) Field of Classification Search
CPC .. G06F 17/30958; G06F 19/00; G06F 19/324; G06F 19/3418; G06F 8/24

See application file for complete search history.

(56) References Cited

U.S. PATENT DOCUMENTS

| | | | |
|---|---|---|---|
| 7,752,198 | B2 | 7/2010 | Canright et al. |
| 8,275,803 | B2 | 9/2012 | Brown et al. |
| 8,370,278 | B2 | 2/2013 | Vadlamani et al. |
| 8,412,747 | B1 | 4/2013 | Harik et al. |
| 8,463,810 | B1 | 6/2013 | Rennison |
| 8,676,866 | B2 | 3/2014 | Lemcke et al. |
| 8,756,231 | B2 | 6/2014 | Hennum et al. |
| 8,972,445 | B2 | 3/2015 | Gorman et al. |
| 9,058,374 | B2 | 6/2015 | Brennan et al. |
| 9,143,163 | B2 | 9/2015 | Grinblat |
| 9,268,844 | B1 | 2/2016 | Kadarkarai et al. |
| 9,304,672 | B2 | 4/2016 | Mital et al. |
| 9,305,076 | B1 | 4/2016 | Kadarkarai |
| 9,535,902 | B1* | 1/2017 | Michalak ............... G06F 16/38 |
| 2005/0209983 | A1* | 9/2005 | MacPherson ........... G06N 5/02 |
| 2007/0250502 | A1 | 10/2007 | Canright et al. |
| 2008/0109416 | A1 | 5/2008 | Williams |
| 2009/0006359 | A1 | 1/2009 | Liao |
| 2009/0287678 | A1 | 11/2009 | Brown et al. |
| 2010/0280989 | A1 | 11/2010 | Mehra et al. |
| 2011/0066587 | A1 | 3/2011 | Ferrucci et al. |
| 2011/0125734 | A1 | 5/2011 | Duboue et al. |
| 2011/0218822 | A1* | 9/2011 | Buisman ............... G06Q 50/22 705/3 |
| 2012/0078911 | A1 | 3/2012 | Johnston et al. |
| 2012/0191684 | A1 | 7/2012 | Epstein |
| 2013/0007055 | A1 | 1/2013 | Brown et al. |
| 2013/0018652 | A1 | 1/2013 | Ferrucci et al. |
| 2013/0066886 | A1 | 3/2013 | Bagchi et al. |
| 2013/0246328 | A1* | 9/2013 | Sweeney ............... G06N 7/005 706/50 |
| 2014/0046653 | A1 | 2/2014 | Gopalakrishnan et al. |
| 2014/0149132 | A1 | 5/2014 | DeHaan et al. |
| 2014/0280353 | A1 | 9/2014 | Delaney et al. |
| 2015/0178268 | A1 | 6/2015 | Zuev et al. |
| 2015/0379010 | A1 | 12/2015 | Allen et al. |
| 2016/0012119 | A1 | 1/2016 | Franceschini et al. |
| 2016/0012336 | A1 | 1/2016 | Franceschini et al. |
| 2016/0048511 | A1 | 2/2016 | Bhagwat et al. |

OTHER PUBLICATIONS

"IBM Watson Ushers in a New Era of Data-Driven Discoveries", IBM Corporation, https://www-03.ibm.com/press/us/en/pressrelease/44697.wss, News Release, Aug. 28, 2014, 4 pages.

"Smart Cleanup Tools", CodeCanyon, http://codecanyon.net/item/smart-cleanup-tools/3714047, retrieved online Jun. 14, 2016, 4 pages.

Barzilay, Regina, "Graph-based Algorithms in NLP", http://ocw.mit.edu/courses/electrical-engineering-and-computer-science/6-864-advanced-natural-language-processing-fall-2005/lecture-notes/lec18.pdf, retrieved from the Internet Aug. 31, 2016, 57 pages.

Doyle, Peter G. et al., "Random walks and electric networks", https://math.dartmouth.edu/~doyle/docs/walks/walks.pdf, Jul. 5, 2006, 118 pages.

High, Rob, "The Era of Cognitive Systems: An Inside Look at IBM Watson and How it Works", IBM Corporation, Redbooks, Dec. 12, 2012, 16 pages.

Hisamitsu, Toru et al., "Extracting useful terms from parenthetical expressions by combining simple rules and statistical measures", https://benjamins.com/#catalog/books/nlp.2.11his/details, copyright 1998 (month unknown), Abstract only, 1 page.

Kevin, Lim J., "Linear Representation of Graphs", School of Computing, National University of Singapore, http://www.nus.edu.sg/nurop/2009/SoC/nurop_Lim_Junliang_Kevin_U057080U.pdf, Singapore, 2009, retrieved online Jun. 13, 2016, 6 pages.

McCord, M.C. et al., "Deep parsing in Watson", IBM J. Res. & Dev. vol. 56 No. 3/4 Paper 3, May/Jul. 2012, pp. 3:1-3:15.

Molla, Diego, "Learning of Graph-based Question Answering Rules", Workshop on TextGraphs, HLT-NAACL 2006, New York City, NY, Jun. 2006, pp. 37-44.

Muller, Philippe et al., "Synonym Extraction Using a Semantic Distance on a Dictionary", Association for Computational Linguistics, Workshop on TextGraphs, at HLT-NAACL 2006, New York City, Jun. 2006, pp. 65-72.

Nastase, Vivi et al., "A Survey of Graphs in Natural Language Processing", Natural Language Processing, https://hlt-nlp.fbk.eu/sites/hlt-nlp.fbk.eu/files/jnle_graph_survey.pdf, Cambridge University Press, Natural Language Engineering 1 (1), Received Sep. 15, 2015, 32 pages.

Nastase, Vivi et al., "Matching Syntactic-Semantic Graphs for Semantic Relation Assignment", Workshop on TextGraphs, HLT-NAACL 2006, New York City, NY, Jun. 2006, pp. 81-88.

Rahm, Erhard et al., "A survey of approaches to automatic schema matching", The VLDB Journal 10, http://dbs.uni-leipzig.de/file/VLDBJ-Dec2001.pdf, Dec. 2001, pp. 334-350.

Shahri, Hamid H., "A Machine Learning Approach to Data Cleaning in Databases and Data Warehouses", University of Maryland, Progressive Methods in Data Warehousing and Business Intelligence: Concepts and Competitive Analytics, Chapter III, Copyright 2009 (month unknown), pp. 43-58.

Trim, Craig, "NLP-driven Ontology Modeling", IBM Corporation, IBM Developerworks, Language Processing, retrieved from the Internet Apr. 29, 2016, 5 pages.

Trim, Craig, "Ontology-driven NLP", IBM Corporation, IBM developerWorks, Language Processing, retrieved from the Internet Apr. 29, 2016, 3 pages.

Tsang, Vivian et al., "Context Comparison as a Minimum Cost Flow Problem", Association for Computational Linguistics, Workshop on TextGraphs, at HLT-NAACL, New York City, Jun. 2006, pp. 97-104.

Turney, Peter D. et al., "From Frequency to Meaning: Vector Space Models of Semantics", Journal of Artificial Intelligence Research, Chapter 37, https://www.jair.org/media/2934/live-2934-4846-jair.pdf, Feb. 2010, pp. 141-188.

Van Der Plas, Lonneke et al., "Finding Synonyms Using Automatic Word Alignment and Measures of Distributional Similarity", Proceedings of the COLING/ACL 2006 Main Conference Poster Sessions, http://www.aclweb.org/anthology/P06-2111, Sydney, Jul. 2006, pp. 866-873.

Wang, Chang et al., "Medical Synonym Extraction with Concept Space Models", IBM T. J. Watson Research Lab, arXiv:1506.00528 [cs.CL], Jun. 1, 2015, 7 pages.

Welty, Chris et al., "Query Driven Hypothesis Generation for Answering Queries over NLP Graphs", Proceedings of the 11th International Semantic Web Conference, Boston, MA, Nov. 11-15, 2012, 15 pages.

Yu, Hong et al., "Automatic Extraction of Gene and Protein Synonyms from Medline and Journal Articles", Proceeding of the AMIA Annual Symposium 2002, http://www.ncbi.nlm.nih.gov/pmc/articles/PMC2244511/pdf/procamiasymp00001-0960.pdf, San Antonio, Texas, Nov. 9-13, 2002, pp. 919-923.

Yuan, Michael J., "Watson and healthcare, How natural language processing and semantic search could revolutionize clinical decision support", IBM developerWorks, IBM Corporation, Apr. 12, 2011, 14 pages.

Zhu, Xiaojin et al., "Improving Diversity in Ranking using Absorbing Random Walks", http://www.david-andrzejewski.com/publications/hlt-naacl_2007.pdf, published 2007 (month unknown), retrieved from the Internet Aug. 31, 2016, 8 pages.

\* cited by examiner

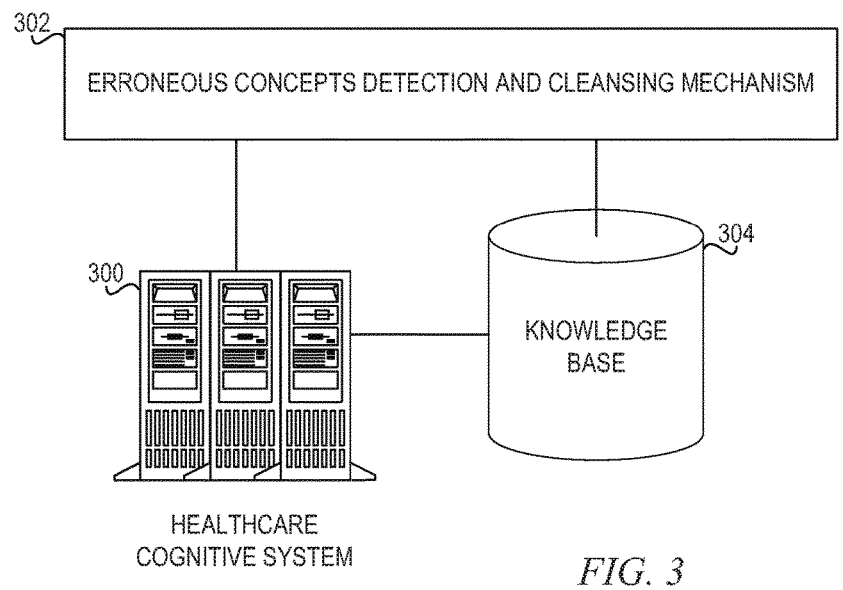
FIG. 3
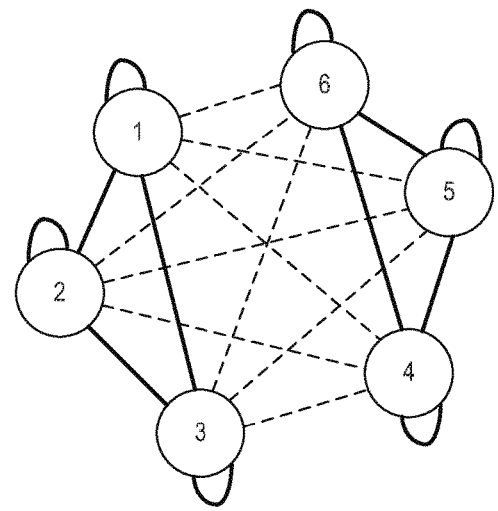
|   | 1 | 2 | 3 | 4 | 5 | 6 |
|---|---|---|---|---|---|---|
| 1 | 0.6 | 0.1 | 0.1 | 0.05 | 0.05 | 0.1 |
| 2 | 0.2 | 0.57 | 0.2 | 0.01 | 0.01 | 0.01 |
| 3 | 0.2 | 0.2 | 0.48 | 0.01 | 0.01 | 0.1 |
| 4 | 0.1 | 0.1 | 0.1 | 0.3 | 0.2 | 0.2 |
| 5 | 0.01 | 0.01 | 0.01 | 0.2 | 0.57 | 0.2 |
| 6 | 0.1 | 0.01 | 0.01 | 0.2 | 0.2 | 0.48 |
FIG. 4A
FIG. 4B

AUTOMATIC DETECTION AND CLEANSING OF ERRONEOUS CONCEPTS IN AN AGGREGATED KNOWLEDGE BASE

BACKGROUND

The present application relates generally to an improved data processing apparatus and method and more specifically to mechanisms for automatically detecting and cleansing erroneous concepts in an aggregated knowledge base.

Decision-support systems exist in many different industries where human experts require assistance in retrieving and analyzing information. An example that will be used throughout this application is a diagnosis system employed in the healthcare industry. Diagnosis systems can be classified into systems that use structured knowledge, systems that use unstructured knowledge, and systems that use clinical decision formulas, rules, trees, or algorithms. The earliest diagnosis systems used structured knowledge or classical, manually constructed knowledge bases. The Internist-I system developed in the 1970s uses disease-finding relations and disease-disease relations. The MYCIN system for diagnosing infectious diseases, also developed in the 1970s, uses structured knowledge in the form of production rules, stating that if certain facts are true, then one can conclude certain other facts with a given certainty factor. DXplain, developed starting in the 1980s, uses structured knowledge similar to that of Internist-I, but adds a hierarchical lexicon of findings.

Iliad, developed starting in the 1990s, adds more sophisticated probabilistic reasoning where each disease has an associated a priori probability of the disease (in the population for which Iliad was designed), and a list of findings along with the fraction of patients with the disease who have the finding (sensitivity), and the fraction of patients without the disease who have the finding (1-specificity).

In 2000, diagnosis systems using unstructured knowledge started to appear. These systems use some structuring of knowledge such as, for example, entities such as findings and disorders being tagged in documents to facilitate retrieval. ISABEL, for example, uses Autonomy information retrieval software and a database of medical textbooks to retrieve appropriate diagnoses given input findings. Autonomy Auminence uses the Autonomy technology to retrieve diagnoses given findings and organizes the diagnoses by body system. First CONSULT allows one to search a large collection of medical books, journals, and guidelines by chief complaints and age group to arrive at possible diagnoses. Portable Emergency Physician Information Database (PEPID) differential diagnosis (DDX) is a diagnosis generator based on PEPID's independent clinical content.

Clinical decision rules have been developed for a number of medical disorders, and computer systems have been developed to help practitioners and patients apply these rules. The Acute Cardiac Ischemia Time-Insensitive Predictive Instrument (ACI-TIPI) takes clinical and electrocardiogram (ECG) features as input and produces probability of acute cardiac ischemia as output to assist with triage of patients with chest pain or other symptoms suggestive of acute cardiac ischemia. ACI-TIPI is incorporated into many commercial heart monitors/defibrillators. The CaseWalker system uses a four-item questionnaire to diagnose major depressive disorder. The Problem-Knowledge Couplers® (PKC) Advisor provides guidance on 98 patient problems such as abdominal pain and vomiting.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method is provided, in a data processing system comprising at least one processor and at least one memory, the at least one memory comprising instructions executed by the at least one processor to cause the at least one processor to implement a natural language processing system that automatically detects and cleanses erroneous concepts in an aggregated knowledge base. The illustrative embodiment receives a portion of natural language content related to a selected concept from a knowledge base. The illustrative embodiment generates a graph data structure representing the concept present in the portion of the natural language content. In the illustrative embodiment, nodes of the graph data structure comprise a first node representing a name of the concept and a one or more other nodes representing synonyms associated with the first node and, in the illustrative embodiment, the graph data structure further indicates relationships between the first node and the one or more other nodes. The illustrative embodiment analyzes the graph data structure to determine whether or not the graph data structure comprises one or more concept conflicts in association with a set of nodes in the graph data structure. In the illustrative embodiment, the one or more concept conflicts are associated with the set of nodes if two or more nodes represent separate and distinct concepts. The illustrative embodiment splits the two or more nodes into separate distinct concepts within the knowledge base in response to determining that there are one or more concept conflicts due to there being two or more nodes representing separate and distinct concepts.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 3 is an example diagram illustrating an interaction of elements of a healthcare cognitive system in accordance with one illustrative embodiment;

FIG. 4A depicts an exemplary probability transition matrix P for the selected concept in accordance with an illustrative embodiment;

FIG. 4B depicts an exemplary graph data structure with strong connections for the selected concept in accordance with an illustrative embodiment;

DETAILED DESCRIPTION

Figure 1:
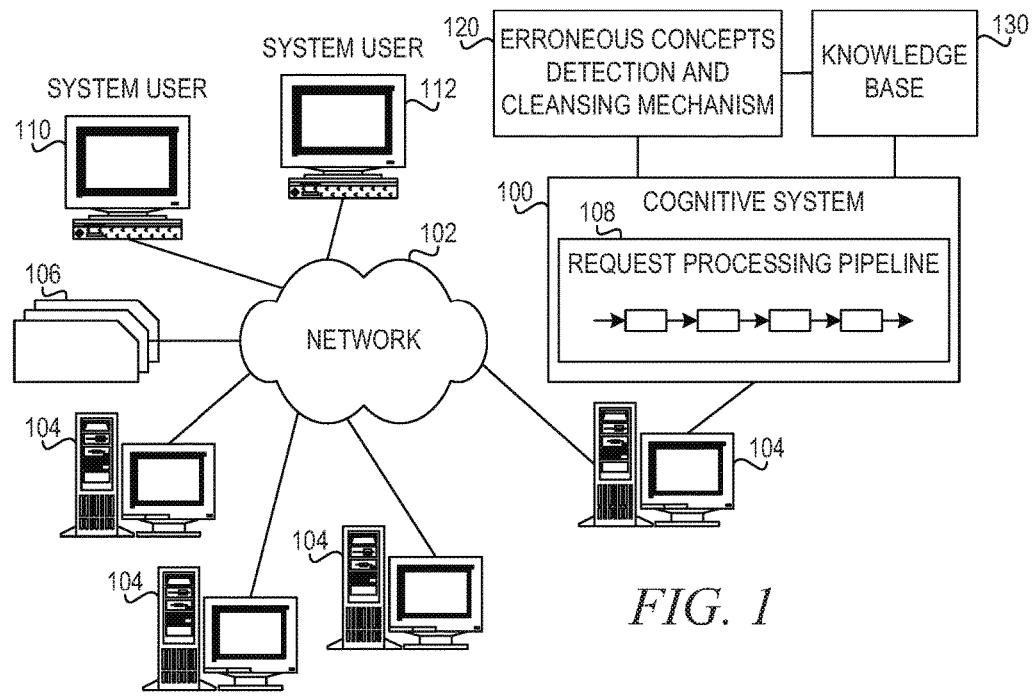
FIG. 1 depicts a schematic diagram of one illustrative embodiment of a cognitive healthcare system in a computer network.

The strengths of current medical diagnosis, patient health management, and patient treatment recommendation systems are that they may improve medical practitioners' diagnostic hypotheses, may help medical practitioners avoid missing important diagnoses, and may assist medical practitioners with determining appropriate treatments for specific diseases. However, current systems still suffer from significant drawbacks which should be addressed in order to make such systems more accurate and usable for a variety of healthcare applications as well as more representative of the way in which human healthcare practitioners diagnose and treat patients. In particular, one drawback of current systems is that the vast knowledge base, which is formed by aggregating data from a large number of data sources, is aggregated and normalized using a variety of techniques such as common chemical structures, common synonyms, relationships, or the like. Unfortunately, each data source utilizes terms that are specific to that data source but, when combined with other data sources, may cause concept conflicts such as noisy synonyms, ambiguous abbreviations, incorrect relationships, or the like. A concept is a collection of a canonical name along with a set of synonyms, such as, for example, high blood pressure, hypertension, and arterial hypertension together represents a concept. A canonical name is a preferred real-world name for an entity, for example, high blood pressure is a canonical name for hypertension. When used in current medical diagnosis, patient health management, and patient treatment recommendation systems, these concept conflicts may lead to erroneous results, which has resulted in degrading the quality and usefulness of current medical diagnosis, patient health management, and patient treatment recommendation systems.

An example of a concept conflict, specifically an ambiguous abbreviation, is the abbreviation RA. In one data source, the abbreviation RA is synonymous with the medical term rheumatoid arthritis that is an autoimmune disease in which the body's immune system, which normally protects its health by attacking foreign substances like bacteria and viruses, mistakenly attacks the joints within the body. In another data source, the abbreviation RA is synonymous with the medical term refractory anemia that is any of a group of anemic conditions that is not associated with another disease and that is marked by a persistent, frequently advanced anemia that can only be successfully treated through blood transfusions. However, during ingestion of the data sources into a knowledge base, RA is associated with rheumatoid arthritis and refractory anemia. Thus, when a researcher is utilizing current medical diagnosis, patient health management, and patient treatment recommendation systems to identify a medication used to treat refractory anemia, the current medical diagnosis, patient health management, and patient treatment recommendation systems may identify the medication Cortisone, which is a synthetically produced medication used as an anti-inflammatory and anti-allergy agent, i.e. used to treat rheumatoid arthritis and should not be used to treat refractory anemia. Thus, a RA concept conflict exists within the knowledge base.

As another example of a concept conflict, specifically noisy synonyms, is the term medical term of cancer. In one data source, cancer is utilized as a synonym for ovarian cancer, which is a type of cancer that begins in the ovaries. In another data source, cancer is utilized as a synonym for kidney cancer, also known as renal cancer, which is a type of cancer that starts in the cells in the kidney. However, during ingestion of the data sources into a knowledge base, since cancer is used as a synonym for both ovarian cancer and kidney cancer, the kidney cancer may be made incorrectly synonymous with ovarian cancer. Thus, when a researcher is utilizing current medical diagnosis, patient health management, and patient treatment recommendation systems to identify a medication to treat kidney cancer, the current medical diagnosis, patient health management, and patient treatment recommendation systems may identify the medication Cisplatin, which is a chemotherapy drug used to treat ovarian cancer and is known to have toxic effects on kidneys. Thus, using the term cancer as a synonymous term for any type of cancer would be incorrect in medical diagnosis, patient health management, and patient treatment recommendation systems.

Therefore, the illustrative embodiments provide mechanisms for automatically detecting and cleansing erroneous concepts in an aggregated knowledge base. The mechanisms receive a portion of natural language content from the knowledge base. The mechanisms generate a graph data structure representing a selected concept present in the portion of the natural language content within a knowledge base, where nodes of the graph data structure represent a canonical name for the selected concept and a set of synonyms identified from a knowledge base as being associated with the canonical name and edges represent relationships between the canonical name and the set of synonyms identified from a knowledge base as being associated with the canonical name. The mechanisms analyze the graph data structure to determine whether or not the graph data structure comprises one or more concept conflicts in association with a node in the graph data structure, where the one or more concept conflicts are associated with the selected concept if at least two nodes in the graph data structure represent separate distinct concepts. Responsive to determining that there are one or more concept conflicts due to there being separate distinct concepts associated with the selected concept, the mechanisms split the selected concept into separate distinct concepts within the knowledge base.

Before beginning the detailed discussion of the various aspects of the illustrative embodiments, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general purpose hardware, a procedure or method for executing the functions, or a combination of any of the above.

The present description and claims may make use of the terms "a," "at least one of," and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular implementation for accomplishing and/or performing the actions, steps, processes, etc., attributable to and/or performed by the engine. An engine may be, but is not limited to, software, hardware and/or firmware or any combination thereof that performs the specified functions including, but not limited to, any use of a general and/or specialized processor in combination with appropriate software loaded or stored in a machine readable memory and executed by the processor. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

As noted above, the present invention provides mechanisms for automatically detecting and cleansing erroneous concepts in an aggregated knowledge base. The illustrative embodiments may be utilized in many different types of data processing environments. In order to provide a context for the description of the specific elements and functionality of the illustrative embodiments, FIGS. 1-5 are provided hereafter as example environments in which aspects of the illustrative embodiments may be implemented. It should be appreciated that FIGS. 1-5 are only examples and are not intended to assert or imply any limitation with regard to the environments in which aspects or embodiments of the present invention may be implemented. Many modifications to the depicted environments may be made without departing from the spirit and scope of the present invention.

FIGS. 1-5 are directed to describing an example cognitive system for healthcare applications (also referred to herein as a "healthcare cognitive system") which implements a request processing pipeline, such as a Question Answering (QA) pipeline (also referred to as a Question/Answer pipeline or Question and Answer pipeline) for example, request processing methodology, and request processing computer program product with which the mechanisms of the illustrative embodiments are implemented. These requests may be provided as structured or unstructured request messages, natural language questions, or any other suitable format for requesting an operation to be performed by the healthcare cognitive system. As described in more detail hereafter, the particular healthcare application that is implemented in the cognitive system of the present invention is a healthcare application for automatically detecting and cleansing erroneous concepts in an aggregated knowledge base.

It should be appreciated that the healthcare cognitive system, while shown as having a single request processing pipeline in the examples hereafter, may in fact have multiple request processing pipelines. Each request processing pipeline may be separately trained and/or configured to process requests associated with different domains or be configured to perform the same or different analysis on input requests (or questions in implementations using a QA pipeline), depending on the desired implementation. For example, in some cases, a first request processing pipeline may be trained to operate on input requests directed to a first medical malady domain (e.g., various types of blood diseases) while another request processing pipeline may be trained to answer input requests in another medical malady domain (e.g., various types of cancers). In other cases, for example, the request processing pipelines may be configured to provide different types of cognitive functions or support different types of healthcare applications, such as one request processing pipeline being used for patient diagnosis, another request processing pipeline being configured for medical treatment recommendation, another request processing pipeline being configured for patient monitoring, etc.

Moreover, each request processing pipeline may have their own associated corpus within a larger knowledge base or corpora that they ingest and operate on, e.g., one corpus for blood disease domain documents and another corpus for cancer diagnostics domain related documents in the above examples. In some cases, the request processing pipelines may each operate on the same domain of input questions but may have different configurations, e.g., different annotators or differently trained annotators, such that different analysis and potential answers are generated. The healthcare cognitive system may provide additional logic for routing input questions to the appropriate request processing pipeline, such as based on a determined domain of the input request, combining and evaluating final results generated by the processing performed by multiple request processing pipelines, and other control and interaction logic that facilitates the utilization of multiple request processing pipelines.

As noted above, one type of request processing pipeline with which the mechanisms of the illustrative embodiments may be utilized is a Question Answering (QA) pipeline. The description of example embodiments of the present invention hereafter will utilize a QA pipeline as an example of a request processing pipeline that may be augmented to include mechanisms in accordance with one or more illustrative embodiments. It should be appreciated that while the present invention will be described in the context of the cognitive system implementing one or more QA pipelines that operate on an input question, the illustrative embodiments are not limited to such. Rather, the mechanisms of the illustrative embodiments may operate on requests that are not posed as "questions" but are formatted as requests for the cognitive system to perform cognitive operations on a specified set of input data using the associated corpus or corpora and the specific configuration information used to configure the cognitive system. For example, rather than asking a natural language question of "What diagnosis applies to patient P?", the cognitive system may instead receive a request of "generate diagnosis for patient P," or the like. It should be appreciated that the mechanisms of the QA system pipeline may operate on requests in a similar manner to that of input natural language questions with minor modifications. In fact, in some cases, a request may be converted to a natural language question for processing by the QA system pipelines if desired for the particular implementation.

As will be discussed in greater detail hereafter, the illustrative embodiments may be integrated in, augment, and extend the functionality of these QA pipeline, or request processing pipeline, mechanisms of a healthcare cognitive system with regard to automatically detecting and cleansing erroneous concepts in an aggregated knowledge base by generating a graph data structure representing a selected concept present in portion of natural language content within the knowledge base, where nodes of the graph data structure represent a canonical name for the concept and a set of synonyms identified from a knowledge base as being associated with the canonical name and edges represent relationships between the canonical name and the set of synonyms. The mechanisms then analyze the graph data structure to determine whether or not the graph data structure comprises one or more concept conflicts in association with a node in the graph data structure, where the one or more concept conflicts are associated with the selected concept if at least two nodes in the graph data structure represent separate distinct concepts. Responsive to determining that there are one or more concept conflicts due to there being separate distinct concepts associated with the selected concept, the mechanisms split the selected concept into separate distinct concepts within the knowledge base.

Thus, it is important to first have an understanding of how cognitive systems and question and answer creation in a cognitive system implementing a QA pipeline is implemented before describing how the mechanisms of the illustrative embodiments are integrated in and augment such cognitive systems and request processing pipeline, or QA pipeline, mechanisms. It should be appreciated that the mechanisms described in FIGS. 1-5 are only examples and are not intended to state or imply any limitation with regard to the type of cognitive system mechanisms with which the illustrative embodiments are implemented. Many modifications to the example cognitive system shown in FIGS. 1-5 may be implemented in various embodiments of the present invention without departing from the spirit and scope of the present invention.

As an overview, a cognitive system is a specialized computer system, or set of computer systems, configured with hardware and/or software logic (in combination with hardware logic upon which the software executes) to emulate human cognitive functions. These cognitive systems apply human-like characteristics to conveying and manipulating ideas which, when combined with the inherent strengths of digital computing, can solve problems with high accuracy and resilience on a large scale. A cognitive system performs one or more computer-implemented cognitive operations that approximate a human thought process as well as enable people and machines to interact in a more natural manner so as to extend and magnify human expertise and cognition. A cognitive system comprises artificial intelligence logic, such as natural language processing (NLP) system based logic, for example, and machine learning logic, which may be provided as specialized hardware, software executed on hardware, or any combination of specialized hardware and software executed on hardware. The logic of the cognitive system implements the cognitive operation(s), examples of which include, but are not limited to, question answering, identification of related concepts within different portions of content in a corpus, intelligent search algorithms, such as Internet web page searches, for example, medical diagnostic and treatment recommendations, and other types of recommendation generation, e.g., items of interest to a particular user, potential new contact recommendations, or the like.

IBM Watson™ is an example of one such cognitive system which can process human readable language and identify inferences between text passages with human-like high accuracy at speeds far faster than human beings and on a larger scale. In general, such cognitive systems are able to perform the following functions:

Navigate the complexities of human language and understanding;
Ingest and process vast amounts of structured and unstructured data;
Generate and evaluate hypothesis;
Weigh and evaluate responses that are based only on relevant evidence;
Provide situation-specific advice, insights, and guidance;
Improve knowledge and learn with each iteration and interaction through machine learning processes;
Enable decision making at the point of impact (contextual guidance);
Scale in proportion to the task;
Extend and magnify human expertise and cognition;
Identify resonating, human-like attributes and traits from natural language;
Deduce various language specific or agnostic attributes from natural language;
High degree of relevant recollection from data points (images, text, voice) (memorization and recall);
Predict and sense with situational awareness that mimic human cognition based on experiences; and/or
Answer questions based on natural language and specific evidence.

In one aspect, cognitive systems provide mechanisms for answering questions posed to these cognitive systems using a Question Answering pipeline or system (QA system) and/or process requests which may or may not be posed as natural language questions. The QA pipeline or system is an artificial intelligence application executing on data processing hardware that answers questions pertaining to a given subject-matter domain presented in natural language. The QA pipeline receives inputs from various sources including input over a network, a corpus of electronic documents or other data, data from a content creator, information from one or more content users, and other such inputs from other possible sources of input. Data storage devices store the corpus of data. A content creator creates content in a document for use as part of a corpus of data with the QA pipeline. The document may include any file, text, article, or source of data for use in the QA system. For example, a QA pipeline accesses a body of knowledge about the domain, or subject matter area, e.g., financial domain, medical domain, legal domain, etc., where the body of knowledge (knowledge base) can be organized in a variety of configurations, e.g., a structured repository of domain-specific information, such as ontologies, or unstructured data related to the domain, or a collection of natural language documents about the domain.

Content users input questions to a cognitive system which implements the QA pipeline. The QA pipeline then answers the input questions using the content in the corpus of data by evaluating documents, sections of documents, portions of data in the corpus, or the like. When a process evaluates a given section of a document for semantic content, the process can use a variety of conventions to query such document from the QA pipeline, e.g., sending the query to the QA pipeline as a well-formed question which is then interpreted by the QA pipeline and a response is provided containing one or more answers to the question. Semantic content is content based on the relation between signifiers, such as words, phrases, signs, and symbols, and what they stand for, their denotation, or connotation. In other words, semantic content is content that interprets an expression, such as by using Natural Language Processing.

As will be described in greater detail hereafter, the QA pipeline receives an input question, parses the question to extract the major features of the question, uses the extracted features to formulate queries, and then applies those queries to the corpus of data. Based on the application of the queries to the corpus of data, the QA pipeline generates a set of hypotheses, or candidate answers to the input question, by looking across the corpus of data for portions of the corpus of data that have some potential for containing a valuable response to the input question. The QA pipeline then performs deep analysis on the language of the input question and the language used in each of the portions of the corpus of data found during the application of the queries using a variety of reasoning algorithms. There may be hundreds or even thousands of reasoning algorithms applied, each of which performs different analysis, e.g., comparisons, natural language analysis, lexical analysis, or the like, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the QA pipeline. The statistical model is used to summarize a level of confidence that the QA pipeline has regarding the evidence that the potential response, i.e. candidate answer, is inferred by the question. This process is repeated for each of the candidate answers until the QA pipeline identifies candidate answers that surface as being significantly stronger than others and thus, generates a final answer, or ranked set of answers, for the input question.

As mentioned above, QA pipeline mechanisms operate by accessing information from a corpus of data or information (also referred to as a corpus of content), analyzing it, and then generating answer results based on the analysis of this data. Accessing information from a corpus of data typically includes: a database query that answers questions about what is in a collection of structured records, and a search that delivers a collection of document links in response to a query against a collection of unstructured data (text, markup language, etc.). Conventional question answering systems are capable of generating answers based on the corpus of data and the input question, verifying answers to a collection of questions for the corpus of data, correcting errors in digital text using a corpus of data, and selecting answers to questions from a pool of potential answers, i.e. candidate answers.

Content creators, such as article authors, electronic document creators, web page authors, document database creators, and the like, determine use cases for products, solutions, and services described in such content before writing their content. Consequently, the content creators know what questions the content is intended to answer in a particular topic addressed by the content. Categorizing the questions, such as in terms of roles, type of information, tasks, or the like, associated with the question, in each document of a corpus of data allows the QA pipeline to more quickly and efficiently identify documents containing content related to a specific query. The content may also answer other questions that the content creator did not contemplate that may be useful to content users. The questions and answers may be verified by the content creator to be contained in the content for a given document. These capabilities contribute to improved accuracy, system performance, machine learning, and confidence of the QA pipeline. Content creators, automated tools, or the like, annotate or otherwise generate metadata for providing information useable by the QA pipeline to identify these question and answer attributes of the content.

Operating on such content, the QA pipeline generates answers for input questions using a plurality of intensive analysis mechanisms which evaluate the content to identify the most probable answers, i.e. candidate answers, for the input question. The most probable answers are output as a ranked listing of candidate answers ranked according to their relative scores or confidence measures calculated during evaluation of the candidate answers, as a single final answer having a largest ranking score or confidence measure, or which is a best match to the input question, or a combination of ranked listing and final answer.

FIG. 1 depicts a schematic diagram of one illustrative embodiment of a cognitive system 100 implementing a request processing pipeline 108, which in some embodiments may be a question answering (QA) pipeline, in a computer network 102. For purposes of the present description, it will be assumed that the request processing pipeline 108 is implemented as a QA pipeline that operates on structured and/or unstructured requests in the form of input questions. One example of a question processing operation which may be used in conjunction with the principles described herein is described in U.S. Patent Application Publication No. 2011/0125734, which is herein incorporated by reference in its entirety. The cognitive system 100 is implemented on one or more computing devices 104 (comprising one or more processors and one or more memories, and potentially any other computing device elements generally known in the art including buses, storage devices, communication interfaces, and the like) connected to the computer network 102. The network 102 includes multiple computing devices 104 in communication with each other and with other devices or components via one or more wired and/or wireless data communication links, where each communication link comprises one or more of wires, routers, switches, transmitters, receivers, or the like. The cognitive system 100 and network 102 enables question processing and answer generation (QA) functionality for one or more cognitive system users via their respective computing devices 110-112. Other embodiments of the cognitive system 100 may be used with components, systems, subsystems, and/or devices other than those that are depicted herein.

The cognitive system 100 is configured to implement a QA pipeline 108 that receive inputs from various sources. For example, the cognitive system 100 receives input from the network 102, a corpus of electronic documents 106, cognitive system users, and/or other data and other possible sources of input. In one embodiment, some or all of the inputs to the cognitive system 100 are routed through the network 102. The various computing devices 104 on the network 102 include access points for content creators and QA system users. Some of the computing devices 104 include devices for a database storing the corpus of data 106 (which is shown as a separate entity in FIG. 1 for illustrative purposes only). Portions of the corpus of data 106 may also be provided on one or more other network attached storage devices, in one or more databases, or other computing devices not explicitly shown in FIG. 1. The network 102 includes local network connections and remote connections in various embodiments, such that the cognitive system 100 may operate in environments of any size, including local and global, e.g., the Internet.

In one embodiment, the content creator creates content in a document of the corpus of data 106 for use as part of a corpus of data with the cognitive system 100. The document includes any file, text, article, or source of data for use in the cognitive system 100. QA system users access the cognitive system 100 via a network connection or an Internet connection to the network 102, and input questions to the cognitive system 100 that are answered by the content in the corpus of data 106. In one embodiment, the questions are formed using natural language. The cognitive system 100 parses and interprets the question via a QA pipeline 108, and provides a response to the cognitive system user, e.g., cognitive system user 110, containing one or more answers to the question. In some embodiments, the cognitive system 100 provides a response to users in a ranked list of candidate answers while in other illustrative embodiments, the cognitive system 100 provides a single final answer or a combination of a final answer and ranked listing of other candidate answers.

The cognitive system 100 implements the QA pipeline 108 which comprises a plurality of stages for processing an input question and the corpus of data 106. The QA pipeline 108 generates answers for the input question based on the processing of the input question and the corpus of data 106. The QA pipeline 108 will be described in greater detail hereafter with regard to FIG. 3.

In some illustrative embodiments, the cognitive system 100 may be the IBM Watson™ cognitive system available from International Business Machines Corporation of Armonk, N.Y., which is augmented with the mechanisms of the illustrative embodiments described hereafter. As outlined previously, a QA pipeline of the IBM Watson™ cognitive system receives an input question which it then parses to extract the major features of the question, which in turn are then used to formulate queries that are applied to the corpus of data. Based on the application of the queries to the corpus of data, a set of hypotheses, or candidate answers to the input question, are generated by looking across the corpus of data for portions of the corpus of data that have some potential for containing a valuable response to the input question. The QA pipeline of the IBM Watson™ cognitive system then performs deep analysis on the language of the input question and the language used in each of the portions of the corpus of data found during the application of the queries using a variety of reasoning algorithms.

The scores obtained from the various reasoning algorithms are then weighted against a statistical model that summarizes a level of confidence that the QA pipeline of the IBM Watson™ cognitive system has regarding the evidence that the potential response, i.e. candidate answer, is inferred by the question. This process is repeated for each of the candidate answers to generate a ranked listing of candidate answers which may then be presented to the user that submitted the input question, or from which a final answer is selected and presented to the user. More information about the QA pipeline of the IBM Watson™ cognitive system may be obtained, for example, from the IBM Corporation website, IBM Redbooks, and the like. For example, information about the QA pipeline of the IBM Watson™ cognitive system can be found in Yuan et al., "Watson and Healthcare," IBM developerWorks, 2011 and "The Era of Cognitive Systems: An Inside Look at IBM Watson and How it Works" by Rob High, IBM Redbooks, 2012.

As noted above, while the input to the cognitive system 100 from a client device may be posed in the form of a natural language question, the illustrative embodiments are not limited to such. Rather, the input question may in fact be formatted or structured as any suitable type of request which may be parsed and analyzed using structured and/or unstructured input analysis, including but not limited to the natural language parsing and analysis mechanisms of a cognitive system such as IBM Watson™, to determine the basis upon which to perform cognitive analysis and providing a result of the cognitive analysis. In the case of a healthcare based cognitive system, this analysis may involve processing patient medical records, medical guidance documentation from one or more corpora, and the like, to provide a healthcare oriented cognitive system result.

In the context of the present invention, cognitive system 100 may provide a cognitive functionality for assisting with healthcare based operations. For example, depending upon the particular implementation, the healthcare based operations may comprise patient diagnostics, medical treatment recommendation systems, medical practice management systems, personal patient care plan generation and monitoring, patient electronic medical record (EMR) evaluation for various purposes, such as for identifying patients that are suitable for a medical trial or a particular type of medical treatment, or the like. Thus, the cognitive system 100 may be a healthcare cognitive system 100 that operates in the medical or healthcare type domains and which may process requests for such healthcare operations via the request processing pipeline 108 input as either structured or unstructured requests, natural language input questions, or the like. In one illustrative embodiment, the cognitive system 100 is an erroneous concept detection and cleansing system for a knowledge base that splits multiple concepts that are identified as being associated with a single node into multiple separate concepts.

In an illustrative embodiment, the cognitive system 100 implements erroneous concepts detection and cleansing mechanism 120 for automatically detecting and cleansing erroneous concepts in an aggregated knowledge base 130. Knowledge base 130 is a body of knowledge about the domain, or subject matter area, e.g., financial domain, medical domain, legal domain, etc., where the body of knowledge (knowledge base) can be organized in a variety of configurations, e.g., a structured repository of domain-specific information, such as ontologies, or unstructured data related to the domain, or a collection of natural language documents about the domain. Knowledge base 130 accesses data in one or more databases storing information about the electronic texts, documents, articles, websites, and the like, that make up the corpora of data/information. That is, these various sources themselves, different collections of sources, and the like, represent a different corpus of data/information within the corpora of data/information.

In one embodiment, erroneous concepts detection and cleansing mechanism 120 receives a portion of natural language content from knowledge base 130. Erroneous concepts detection and cleansing mechanism 120 generates a graph data structure representing a concept present in the portion of the natural language content, where nodes of the graph data structure represent a canonical name for the selected concept and a set of synonyms identified from a knowledge base as being associated with the canonical name and edges represent relationships between the canonical name and the set of synonyms. Erroneous concepts detection and cleansing mechanism 120 analyzes the graph data structure to determine whether or not the graph data structure comprises one or more concept conflicts in association with a node in the graph data structure, where the one or more concept conflicts are associated with the selected concept if at least two nodes in the graph data structure represent separate distinct concepts. Responsive to determining that there are one or more concept conflicts due to there being separate distinct concepts associated with the selected concept, erroneous concepts detection and cleansing mechanism 120 splits the selected concept into separate distinct concepts within the knowledge base.

Figure 2:
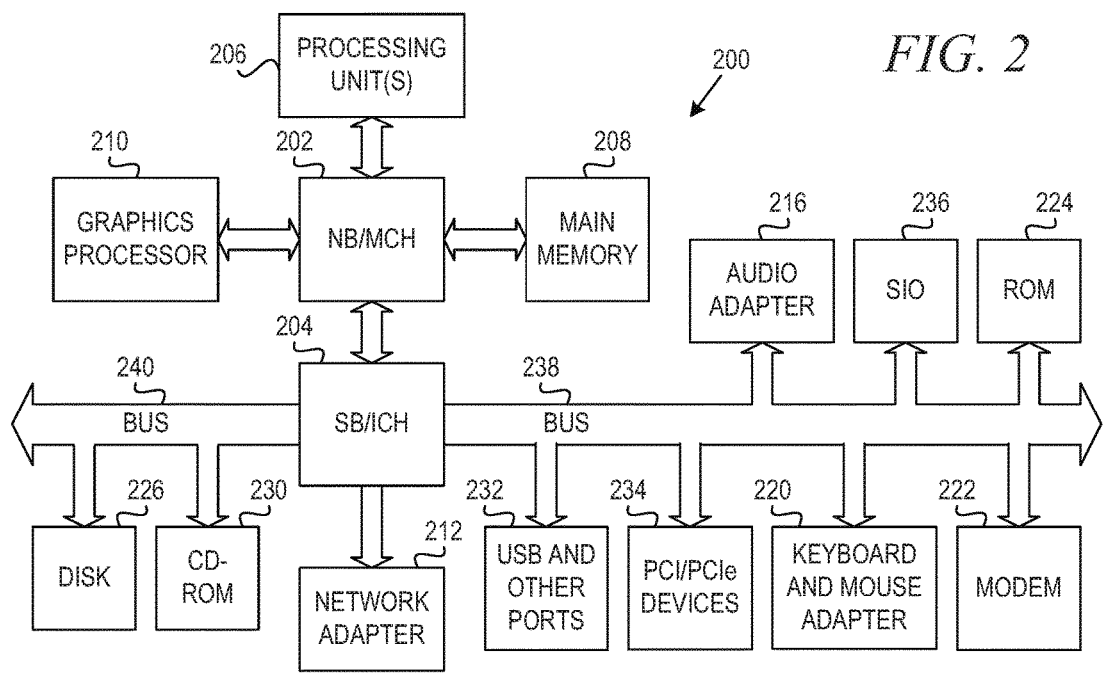
FIG. 2 is a block diagram of an example data processing system in which aspects of the illustrative embodiments are implemented.

As noted above, the mechanisms of the illustrative embodiments are rooted in the computer technology arts and are implemented using logic present in such computing or data processing systems. These computing or data processing systems are specifically configured, either through hardware, software, or a combination of hardware and software, to implement the various operations described above. As such, FIG. 2 is provided as an example of one type of data processing system in which aspects of the present invention may be implemented. Many other types of data processing systems may be likewise configured to specifically implement the mechanisms of the illustrative embodiments.

FIG. 2 is a block diagram of an example data processing system in which aspects of the illustrative embodiments are implemented. Data processing system 200 is an example of a computer, such as server 104 or client 110 in FIG. 1, in which computer usable code or instructions implementing the processes for illustrative embodiments of the present invention are located. In one illustrative embodiment, FIG. 2 represents a server computing device, such as a server 104, which, which implements a cognitive system 100 and QA system pipeline 108 augmented to include the additional mechanisms of the illustrative embodiments described hereafter.

In the depicted example, data processing system 200 employs a hub architecture including North Bridge and Memory Controller Hub (NB/MCH) 202 and South Bridge and Input/Output (I/O) Controller Hub (SB/ICH) 204. Processing unit 206, main memory 208, and graphics processor 210 are connected to NB/MCH 202. Graphics processor 210 is connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 is connected to SB/ICH 204.

An operating system runs on processing unit 206. The operating system coordinates and provides control of various components within the data processing system 200 in FIG. 2. As a client, the operating system is a commercially available operating system such as Microsoft® Windows 10®. An object-oriented programming system, such as the Java™ programming system, may run in conjunction with the operating system and provides calls to the operating system from Java™ programs or applications executing on data processing system 200.

As a server, data processing system 200 may be, for example, an IBM® eServer™ System P® computer system, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and are loaded into main memory 208 for execution by processing unit 206. The processes for illustrative embodiments of the present invention are performed by processing unit 206 using computer usable program code, which is located in a memory such as, for example, main memory 208, ROM 224, or in one or more peripheral devices 226 and 230, for example.

A bus system, such as bus 238 or bus 240 as shown in FIG. 2, is comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, includes one or more devices used to transmit and receive data. A memory may be, for example, main memory 208, ROM 224, or a cache such as found in NB/MCH 202 in FIG. 2.

Those of ordinary skill in the art will appreciate that the hardware depicted in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

FIG. 3 is an example diagram illustrating an interaction of elements of a healthcare cognitive system in accordance with one illustrative embodiment. The example diagram of FIG. 3 depicts an implementation of a healthcare cognitive system 300 that is configured to provide medical treatment recommendations for patients. However, it should be appreciated that this is only an example implementation and other healthcare operations may be implemented in other embodiments of the healthcare cognitive system 300 without departing from the spirit and scope of the present invention.

As shown in FIG. 3, in accordance with one illustrative embodiment, upon receiving a portion of natural language content from a knowledge base 304, for a selected concept, which is a collection of a canonical name for the selected concept and a set of synonyms identified from the knowledge base 304 as being associated with the canonical name, erroneous concepts detection and cleansing mechanism 302 within healthcare cognitive system 300 generates a graph data structure and related weighted matrix W. The graph data structure comprises a set of nodes, each node identifying either the canonical name or synonym from the set of synonyms identified from knowledge base 304 as being associated with the canonical name, and a set of edges representing relationships between the canonical name and the set of synonyms. Canonical names or synonyms that are abbreviations may be filtered before computing W. The abbreviations may then be assigned to the closest cluster (or clusters in case of ties) once detection and cleansing mechanism 302 has performed cleansing on the rest of the nodes of the concept. For a simple example, high blood pressure is the canonical name for hypertension and thus, the canonical name of high blood pressure and the related synonyms of hypertension and arterial hypertension together represent a concept. However, due to noise in knowledge base 304, the canonical name of high blood pressure also has related synonyms of thyroiditis, autoimmune thyroiditis, and Hashimoto's struma.

The weighted matrix W generated by erroneous concepts detection and cleansing mechanism 302 is a n*n matrix where each element in the weighted matrix W represents the similarity between pairs of the canonical name and the set of synonyms identified from knowledge base 304 as being associated with the canonical name. Thus, using (1) high blood pressure, (2) hypertension, (3) arterial hypertension, (4) thyroiditis, (5) autoimmune thyroiditis, and (6) Hashimoto's struma for the concept of high blood pressure, erroneous concepts detection and cleansing mechanism 302 would generate a 6*6 matrix representing the similarity between pairs of the canonical name and the set of synonyms.

For each $i_{th}$ row and $j_{th}$ column, erroneous concepts detection and cleansing mechanism 302 computes a weight representing an edge weight between node i and node j using a function(f) of a feature set:

$$W_{ij} = f(\text{feature set})$$

where a feature set is similarities computed using contextual features of member i, contextual features of member j, edit-distance between i and j, domain specific attributes of member i, domain specific attributes of member j, or the like. As is further illustrated, a high weight $W_{ij}$ indicates that node i and node j are strongly related, while a low weight $W_{ij}$ indicates that node i and node j are weakly related. Notably, the set of values from a selected row equals to one.

Thus, using the weighted matrix W, erroneous concepts detection and cleansing mechanism 302 generates a probability transition matrix P, where each element $P_{ij}$ in probability transition matrix P is computed using:

$$P_{ij} = w_{ij} / \Sigma j \; w_{ij}.$$

FIG. 4A depicts an exemplary probability transition matrix P for the selected concept in accordance with an illustrative embodiment. Notably, with the probability calculated, the set of values from a selected row now equal one. Furthermore, based on the calculated probabilities, as shown in FIG. 4B in accordance with an illustrative embodiment, strong connections may be implied between (1) high blood pressure, (2) hypertension, and (3) arterial hypertension as well as separately between (4) thyroiditis, (5) autoimmune thyroiditis, and (6) Hashimoto's struma in the graph data structure related to the weighted matrix W.

In order to determine/verify whether the given concept consists of multiple concepts, erroneous concepts detection and cleansing mechanism 302 then performs teleporting random walks on probability transition matrix P. A teleporting random walk on P is irreducible, aperiodic and ergodic. Hence, probability transition matrix P has a unique stationary distribution. Erroneous concepts detection and cleansing mechanism 302 selects an item or canonical name ($S_1$) with the largest stationary distribution value from the stationary distribution of visiting probabilities. When two or more nodes receive the same number of stationary probabilities, detection and cleansing mechanism 302 randomly chooses one of the two or more nodes.

In the next operation, erroneous concepts detection and cleansing mechanism 302 uses node 1 as an absorbing state node t where, in a modified probability transition matrix P, the probability at $P_{tt}$ (the intersection of node 1 with node 1, the absorbing state t, in modified probability transition matrix P) is equal to 1 and the probability at $P_{tg}$ (the intersection of node 1, the absorbing state t, with any other node g in modified probability transition matrix P) is equal to 0, where g is not equal to t.

Using the modified probability transition matrix P, erroneous concepts detection and cleansing mechanism 302 calculates the expected number of visits for all the nodes. Thus, the node with the highest number of visits is chosen as the next item/canonical name, for example, node 4 may have the next highest expected number of visits. That is, nodes strongly connected to the absorbing state node (node 1) will have fewer number of visits because the walk tends to be absorbed soon after visiting them. In contradistinction, groups of nodes far away from the absorbing state node (node 1) allow the random walks to linger among them, thus have more visits, for example, node 4.

With the two selected items, node 1 and node 4, erroneous concepts detection and cleansing mechanism 302 assigns the rest of the nodes, nodes 2, 3, 5, and 6, to the closest node, i.e. node 1 or node 4 based on some similarity measure, such as cosine similarity, Euclidean distance, or the like. Thus, in one example, erroneous concepts detection and cleansing mechanism 302 assigns nodes 2 and 3 to node 1 based on closeness and assigns nodes 5 and 6 to node 4 based on closeness.

With nodes 1 and 4 identified as canonical name nodes, i.e. nodes that represent two separate concepts, erroneous concepts detection and cleansing mechanism 302 determines whether there are any other nodes that should be considered as separate concept(s). In order to determine if the two concepts (with node 1 and node 4 as canonical names or central items in the cluster) should be considered as separate concepts or not, erroneous concepts detection and cleansing mechanism 302 computes an inter-cluster distance between pairs of clusters obtained so far (here, two clusters with node 1 and node 4 as central items). If a minimum inter-cluster distance between the newly added concept (node 4 and nodes assigned to it) with respect to the concepts already identified (node 1 and nodes assigned to it) is less than or equal to a user specified threshold, then erroneous concepts detection and cleansing mechanism 302 stops the process of detecting erroneous concepts and identifies clusters obtained in the previous iteration as the concepts. For example, if the minimum inter-cluster distance between the two concepts is less than the user specified threshold, the erroneous concepts detection and cleansing mechanism 302 stops and returns only one concept (node 1 and all other nodes assigned to it). If the minimum inter-cluster distance between the two concepts is greater than the user specified threshold, the erroneous concepts detection and cleansing mechanism 302 considers the two concepts as separate concepts and continues to find the next concept. Based on this identification, erroneous concepts detection and cleansing mechanism 302 performs one or more operation within knowledge base 304 to split the canonical names and their related synonyms such that the two concepts are no longer related within knowledge base 304. That is, erroneous concepts detection and cleansing mechanism 302 performs one or more operations such that, in keeping with the example above, node 1 associated with the canonical name high blood pressure has synonyms of hypertension and arterial hypertension (nodes 2 and 3, respectively) and, in a completely separate concept, node 4 associated with the canonical name thyroiditis has synonyms of autoimmune thyroiditis and Hashimoto's struma (nodes 5 and 6, respectively).

However, if the minimum inter-cluster distance between the clusters formed so far is less than the user specified threshold, erroneous concepts detection and cleansing mechanism 302 stops and returns the clusters that were obtained from the previous iteration. Alternative stopping criteria could be based on average inter-cluster distances between pairs of nodes. In one example, erroneous concepts detection and cleansing mechanism 302 sums the inter-cluster distances between each node in Cluster1 (nodes 1, 2, and 3) and each node in Cluster2 (nodes 4, 5, and 6):

sum of inter-cluster distances=(dist(Node1,Node6)+dist(Node1,Node5)+dist(Node1,Node4)+dist(Node2,Node6)+dist(Node2,Node5)+dist(Node2,Node4)+dist(Node3,Node6)+dist(Node3,Node5)+dist(Node3,Node4)).

Then, erroneous concepts detection and cleansing mechanism 302 finds the average inter-cluster distance:

average inter-cluster distance=sum of inter-cluster distances/number of summed distances.

Erroneous concepts detection and cleansing mechanism 302 then uses node 4 as a new absorbing state t where, in a newly modified probability transition matrix P, the probability at $P_{tt}$ (the intersection of node 4 with node 4, the absorbing state t, in modified probability transition matrix P) is equal to 1 and the probability at $P_{tg}$ (the intersection of node 4, the absorbing state t, with any other node g in modified probability transition matrix P) is equal to 0, where g is not equal to t.

Using the modified probability transition matrix P, erroneous concepts detection and cleansing mechanism 302 calculates the expected number of visits between each remaining node. Thus, the next node with the highest number of visits is chosen as the next canonical name, for example, node 6 has the next highest number of visits. That is, nodes strongly connected to the absorbing state node (node 6) will have fewer number of visits because the walk tends to be absorbed soon after visiting them. In contradistinction, groups of nodes far away from the absorbing state nodes (nodes 1 and 4) allow the random walks to linger among them, thus have more visits, for example, node 6.

With three highest visited nodes identified, i.e. node 1, node 4, and node 6, erroneous concepts detection and cleansing mechanism 302 assigns the rest of the nodes, nodes 2, 3, and 5 to the closest node, i.e. node 1, node 4, or node 6 based on some similarity measure, such as cosine similarity, Euclidean distance, or the like. Thus, in one example, erroneous concepts detection and cleansing mechanism 302 assigns nodes 2 and 3 to node 1 based on closeness, assigns node 5 to node 4 based on closeness, and does not assign any other node to node 6. With nodes 1, 4, and 6 identified as canonical name nodes, i.e. nodes that represent three separate concepts, erroneous concepts detection and cleansing mechanism 302 repeats the process of computing an inter-cluster distance between pairs of clusters obtained so far and comparing a minimum inter-cluster distance to a user specified threshold, as described previously.

Figure 5:
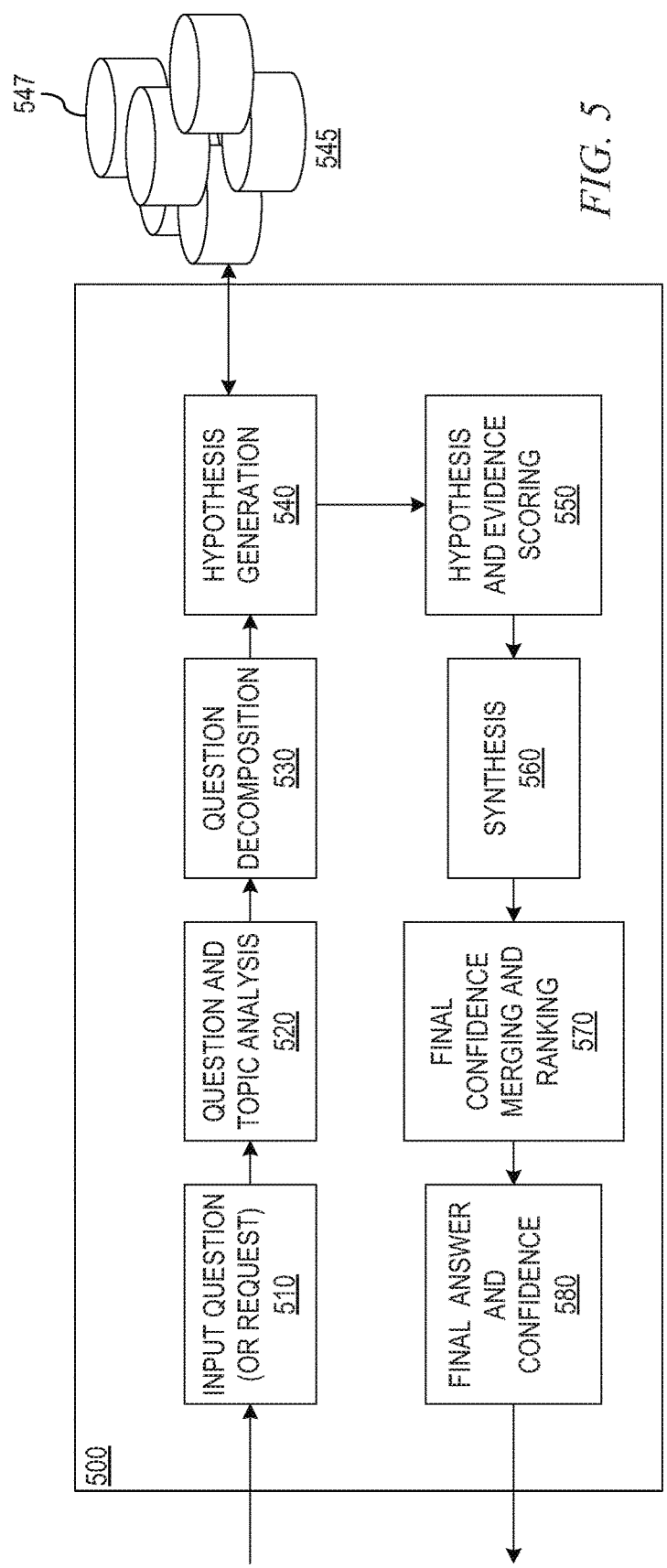
FIG. 5 illustrates a cognitive healthcare system implementing a Question and Answer (QA) or request processing pipeline for processing an input question or request in accordance with one illustrative embodiment.

With the detection and cleansing of erroneous concepts within knowledge base 304 performed by erroneous concepts detection and cleansing mechanism 302, healthcare cognitive system 300 may better answer questions that are received by a QA pipeline of healthcare cognitive system 300. FIG. 5 illustrates a QA pipeline of a healthcare cognitive system, such as healthcare cognitive system 300 in FIG. 3, or an implementation of cognitive system 100 in FIG. 1, for processing an input question in accordance with one illustrative embodiment. It should be appreciated that the stages of the QA pipeline shown in FIG. 5 are implemented as one or more software engines, components, or the like, which are configured with logic for implementing the functionality attributed to the particular stage. Each stage is implemented using one or more of such software engines, components or the like. The software engines, components, etc. are executed on one or more processors of one or more data processing systems or devices and utilize or operate on data stored in one or more data storage devices, memories, or the like, on one or more of the data processing systems. The QA pipeline of FIG. 5 is augmented, for example, in one or more of the stages to implement the improved mechanism of the illustrative embodiments described hereafter, additional stages may be provided to implement the improved mechanism, or separate logic from the pipeline 500 may be provided for interfacing with the pipeline 500 and implementing the improved functionality and operations of the illustrative embodiments.

As shown in FIG. 5, the QA pipeline 500 comprises a plurality of stages 510-580 through which the cognitive system operates to analyze an input question and generate a final response. In an initial question input stage 510, the QA pipeline 500 receives an input question that is presented in a natural language format. That is, a user inputs, via a user interface, an input question for which the user wishes to obtain an answer, e.g., "What medical treatments for diabetes are applicable to a 60 year old patient with cardiac disease?" In response to receiving the input question, the next stage of the QA pipeline 500, i.e. the question and topic analysis stage 520, parses the input question using natural language processing (NLP) techniques to extract major features from the input question, and classify the major features according to types, e.g., names, dates, or any of a plethora of other defined topics. For example, in a question of the type "Who were Washington's closest advisors?", the term "who" may be associated with a topic for "persons" indicating that the identity of a person is being sought, "Washington" may be identified as a proper name of a person with which the question is associated, "closest" may be identified as a word indicative of proximity or relationship, and "advisors" may be indicative of a noun or other language topic. Similarly, in the previous question "medical treatments" may be associated with pharmaceuticals, medical procedures, holistic treatments, or the like, "diabetes" identifies a particular medical condition, "60 years old" indicates an age of the patient, and "cardiac disease" indicates an existing medical condition of the patient.

In addition, the extracted major features include key words and phrases, classified into question characteristics, such as the focus of the question, the lexical answer type (LAT) of the question, and the like. As referred to herein, a lexical answer type (LAT) is a word in, or a word inferred from, the input question that indicates the type of the answer, independent of assigning semantics to that word. For example, in the question "What maneuver was invented in the 1500s to speed up the game and involves two pieces of the same color?," the LAT is the string "maneuver." The focus of a question is the part of the question that, if replaced by the answer, makes the question a standalone statement. For example, in the question "What drug has been shown to relieve the symptoms of ADD with relatively few side effects?," the focus is "drug" since if this word were replaced with the answer, e.g., the answer "Adderall" can be used to replace the term "drug" to generate the sentence "Adderall has been shown to relieve the symptoms of ADD with relatively few side effects." The focus often, but not always, contains the LAT. On the other hand, in many cases it is not possible to infer a meaningful LAT from the focus.

Referring again to FIG. 5, the identified major features are then used during the question decomposition stage 530 to decompose the question into one or more queries that are applied to knowledge base or corpora 545 in order to generate one or more hypotheses. The queries are generated in any known or later developed query language, such as the Structure Query Language (SQL), or the like. The queries are applied to one or more databases storing information about the electronic texts, documents, articles, websites, and the like, that make up a corpora of data/information within knowledge base/corpora 545. That is, these various sources themselves, different collections of sources, and the like, represent a different corpus 547 within the knowledge base/corpora 545. There may be different corpora 547 defined for different collections of documents based on various criteria depending upon the particular implementation. For example, different corpora may be established for different topics, subject matter categories, sources of information, or the like. As one example, a first corpus may be associated with healthcare documents while a second corpus may be associated with financial documents. Alternatively, one corpus may be documents published by the U.S. Department of Energy while another corpus may be IBM Redbooks documents. Any collection of content having some similar attribute may be considered to be a corpus 547 within the knowledge base/corpora 545.

The queries are applied to one or more databases storing information about the electronic texts, documents, articles, websites, and the like, that make up the corpus of data/information, e.g., the corpus of data 106 in FIG. 1. The queries are applied to the corpus of data/information at the hypothesis generation stage 540 to generate results identifying potential hypotheses for answering the input question, which can then be evaluated. That is, the application of the queries results in the extraction of portions of the corpus of data/information matching the criteria of the particular query. These portions of the corpus are then analyzed and used, during the hypothesis generation stage 540, to generate hypotheses for answering the input question. These hypotheses are also referred to herein as "candidate answers" for the input question. For any input question, at this stage 540, there may be hundreds of hypotheses or candidate answers generated that may need to be evaluated.

The QA pipeline 500, in stage 550, then performs a deep analysis and comparison of the language of the input question and the language of each hypothesis or "candidate answer," as well as performs evidence scoring to evaluate the likelihood that the particular hypothesis is a correct answer for the input question. As mentioned above, this involves using a plurality of reasoning algorithms, each performing a separate type of analysis of the language of the input question and/or content of the corpus that provides evidence in support of, or not in support of, the hypothesis. Each reasoning algorithm generates a score based on the analysis it performs which indicates a measure of relevance of the individual portions of the corpus of data/information extracted by application of the queries as well as a measure of the correctness of the corresponding hypothesis, i.e. a measure of confidence in the hypothesis. There are various ways of generating such scores depending upon the particular analysis being performed. In generally, however, these algorithms look for particular terms, phrases, or patterns of text that are indicative of terms, phrases, or patterns of interest and determine a degree of matching with higher degrees of matching being given relatively higher scores than lower degrees of matching.

Thus, for example, an algorithm may be configured to look for the exact term from an input question or synonyms to that term in the input question, e.g., the exact term or synonyms for the term "movie," and generate a score based on a frequency of use of these exact terms or synonyms. In such a case, exact matches will be given the largest scores, while synonyms may be given lower scores based on a relative ranking of the synonyms as may be specified by a subject matter expert (person with knowledge of the particular domain and terminology used) or automatically determined from frequency of use of the synonym in the corpus corresponding to the domain. Thus, for example, an exact match of the term "movie" in content of the corpus (also referred to as evidence, or evidence passages) is given a largest score. A synonym of movie, such as "motion picture" may be given a lower score but still higher than a synonym of the type "film" or "moving picture show." Instances of the exact matches and synonyms for each evidence passage may be compiled and used in a quantitative function to generate a score for the degree of matching of the evidence passage to the input question.

Thus, for example, a hypothesis or candidate answer to the input question of "What was the first movie?" is "The Horse in Motion." If the evidence passage contains the statements "The first motion picture ever made was 'The Horse in Motion' in 1878 by Eadweard Muybridge. It was a movie of a horse running," and the algorithm is looking for exact matches or synonyms to the focus of the input question, i.e. "movie," then an exact match of "movie" is found in the second sentence of the evidence passage and a highly scored synonym to "movie," i.e. "motion picture," is found in the first sentence of the evidence passage. This may be combined with further analysis of the evidence passage to identify that the text of the candidate answer is present in the evidence passage as well, i.e. "The Horse in Motion." These factors may be combined to give this evidence passage a relatively high score as supporting evidence for the candidate answer "The Horse in Motion" being a correct answer.

It should be appreciated that this is just one simple example of how scoring can be performed. Many other algorithms of various complexity may be used to generate scores for candidate answers and evidence without departing from the spirit and scope of the present invention.

In the synthesis stage 560, the large number of scores generated by the various reasoning algorithms are synthesized into confidence scores or confidence measures for the various hypotheses. This process involves applying weights to the various scores, where the weights have been determined through training of the statistical model employed by the QA pipeline 500 and/or dynamically updated. For example, the weights for scores generated by algorithms that identify exactly matching terms and synonym may be set relatively higher than other algorithms that are evaluating publication dates for evidence passages. The weights themselves may be specified by subject matter experts or learned through machine learning processes that evaluate the significance of characteristics evidence passages and their relative importance to overall candidate answer generation.

The weighted scores are processed in accordance with a statistical model generated through training of the QA pipeline 500 that identifies a manner by which these scores may be combined to generate a confidence score or measure for the individual hypotheses or candidate answers. This confidence score or measure summarizes the level of confidence that the QA pipeline 500 has about the evidence that the candidate answer is inferred by the input question, i.e. that the candidate answer is the correct answer for the input question.

The resulting confidence scores or measures are processed by a final confidence merging and ranking stage 570 which compares the confidence scores and measures to each other, compares them against predetermined thresholds, or performs any other analysis on the confidence scores to determine which hypotheses/candidate answers are the most likely to be the correct answer to the input question. The hypotheses/candidate answers are ranked according to these comparisons to generate a ranked listing of hypotheses/candidate answers (hereafter simply referred to as "candidate answers"). From the ranked listing of candidate answers, at stage 580, a final answer and confidence score, or final set of candidate answers and confidence scores, are generated and output to the submitter of the original input question via a graphical user interface or other mechanism for outputting information.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 6A:
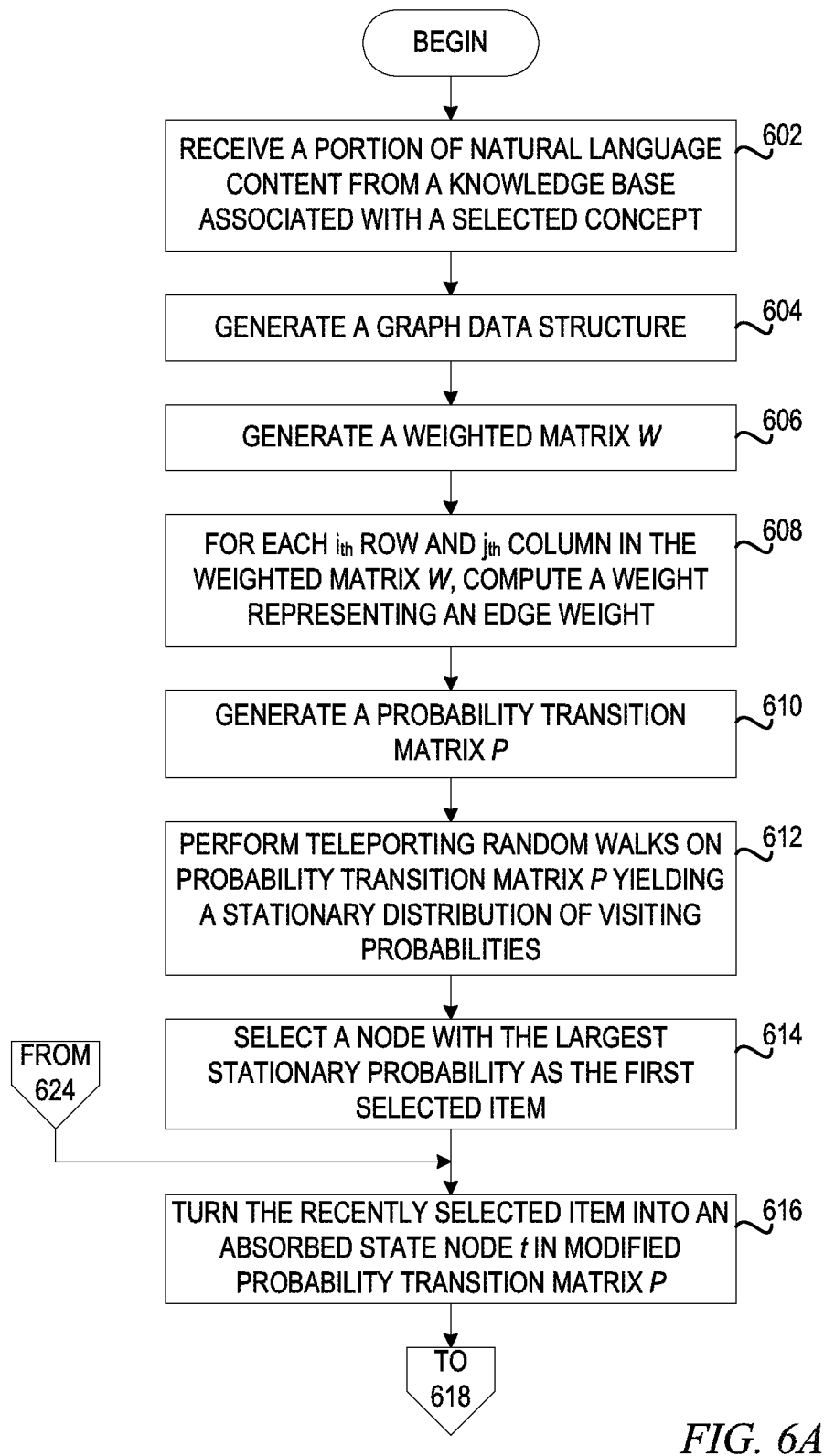
FIGS. 6A and 6B depict a flowchart of the operation performed by an erroneous concepts detection and cleansing mechanism in accordance with one illustrative embodiment.
Figure 6B:
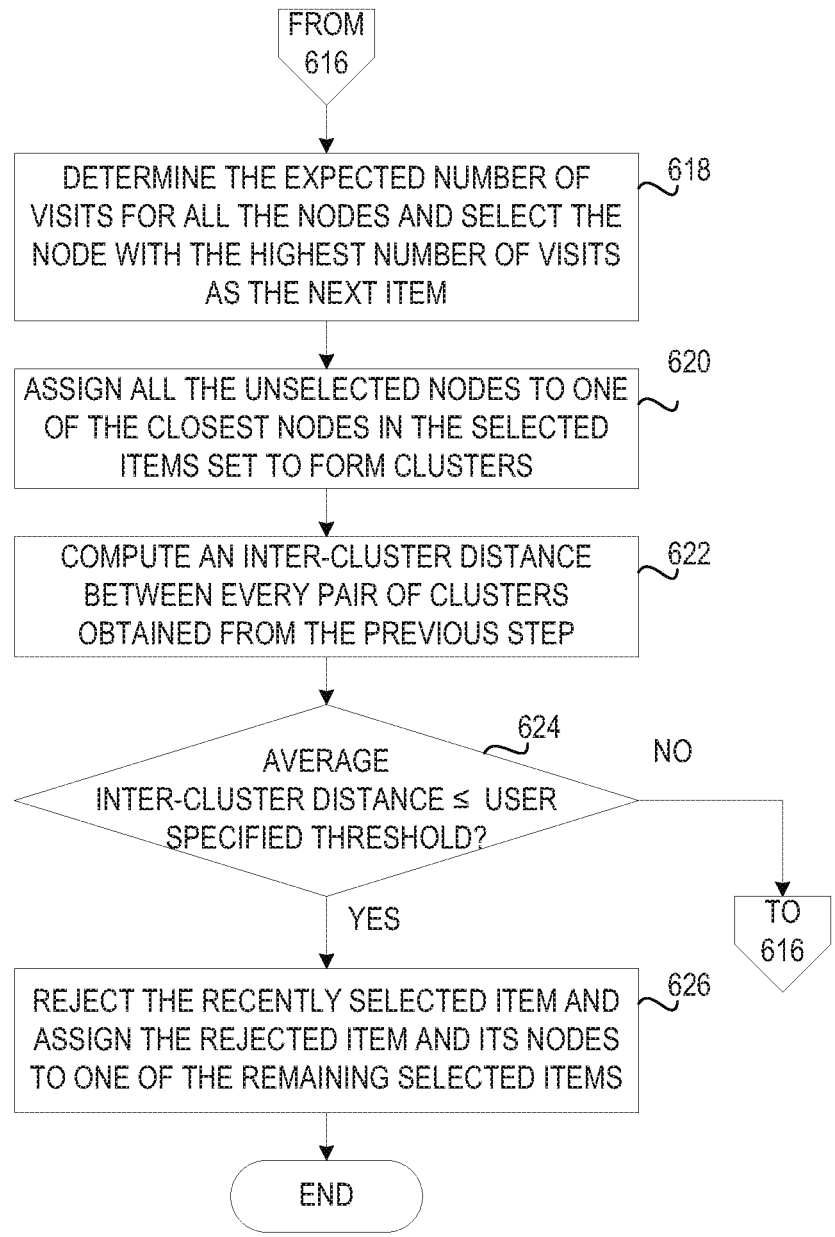

FIGS. 6A and 6B depict a flowchart of the operation performed by an erroneous concepts detection and cleansing mechanism, such as erroneous concepts detection and cleansing mechanism 302 of FIG. 3, in accordance with one illustrative embodiment. As the operation begins, the erroneous concepts detection and cleansing mechanism receives a portion of natural language content from a knowledge base associated with a selected concept (step 602). The selected concept comprises a collection of a canonical name and a set of synonyms identified from the knowledge base as being associated with the canonical name. The erroneous concepts detection and cleansing mechanism generates a graph data structure (step 604). The graph data structure comprises a set of nodes, each node identifying either the canonical name or synonym from the set of synonyms identified from the knowledge base as being associated with the canonical name, and a set of edges representing relationships between the canonical name and the set of synonyms.

The erroneous concepts detection and cleansing mechanism then generates a weighted matrix W (step 606). The weighted matrix W is a n*n matrix where each element in the weighted matrix W represents the similarity between pairs of the canonical name and the set of synonyms identified from the knowledge base as being associated with the canonical name. For each $i_{th}$ row and $j_{th}$ column in the weighted matrix W, the erroneous concepts detection and cleansing mechanism computes a weight representing an edge weight (step 608) between node i and node j using a function(f) of a feature set:

$$W_{ij}=f(\text{feature set})$$

where a feature set is similarities computed using contextual features of member i, contextual features of member j, edit-distance between i and j, domain specific attributes of member i, domain specific attributes of member j, or the like. A high weight $W_{ij}$ indicates that node i and node j are strongly related, while a low weight $W_{ij}$ indicates that node i and node j are weakly related.

Using the weighted matrix W, the erroneous concepts detection and cleansing mechanism generates a probability transition matrix P (step 610) where each element $P_{ij}$ in probability transition matrix P is computed using:

$$P_{ij}=w_{ij}/\Sigma_j w_{ij}.$$

In order to determine/verify whether the given concept consists of multiple concepts, the erroneous concepts detection and cleansing mechanism performs teleporting random walks on probability transition matrix P (step 612). The probability transition matrix P models a random model, i.e. nodes that a user will most likely move or teleport to most often from another node. Therefore, performing teleporting random walks probability transition matrix P yields a stationary distribution of visiting probabilities of each node and thus, the node that is visited the most receives the largest probability. The erroneous concepts detection and cleansing mechanism selects a node with the largest stationary probability as the first selected item (step 614). If two or more nodes have a same stationary distribution value, the erroneous concepts detection and cleansing mechanism selects one of the two or more nodes.

The erroneous concepts detection and cleansing mechanism turns the recently selected item into an absorbed state node t in modified probability transition matrix P (step 616). In doing so, the erroneous concepts detection and cleansing mechanism changes the probability at $P_{tt}$ (the intersection of the selected node and the selected node, the absorbing state t, in modified probability transition matrix P to 1 and the probability at $P_{tg}$ (the intersection of selected node, the absorbing state t, and any other node g in modified probability transition matrix P to 0, where g is not equal to t.

Using the modified probability transition matrix P, the erroneous concepts detection and cleansing mechanism determines the expected number of visits for all the nodes and selects the node with the highest number of visits as the next item (step 618). That is, nodes strongly connected to the absorbing state node t will have fewer number of visits because the walk tends to be absorbed soon after visiting them. In contradistinction, groups of nodes far away from the absorbing state node t allow the random walks to linger among them, thus have more visits.

With the two highest visited nodes identified, the erroneous concepts detection and cleansing mechanism assigns all the unselected nodes to one of the closest nodes in the selected items set to form clusters (step 620) based on some similarity measure, such as cosine similarity, Euclidean distance, or the like. With a set of nodes identified as canonical name nodes, i.e. nodes that represent two separate concepts, the erroneous concepts detection and cleansing mechanism computes an inter-cluster distance between every pair of clusters obtained from the previous step (step 622). The erroneous concepts detection and cleansing mechanism then determines whether the average inter-cluster distance is less than or equal to a user specified threshold (step 624). If at step 624 the erroneous concepts detection and cleansing mechanism determines that the computed inter-cluster distance is less than or equal to the user specified threshold, the erroneous concepts detection and cleansing mechanism rejects the recently selected item and assign the rejected item and its nodes to one of the remaining selected items thereby returning the clusters obtained in the previous iteration as split concepts (step 626), with the operation ending thereafter. If at step 624 the erroneous concepts detection and cleansing mechanism determines that the computed inter-cluster distance is greater than the user specified threshold, the operation returns to step 616.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Thus, the illustrative embodiments provide mechanisms for automatically detecting and cleansing erroneous concepts in an aggregated knowledge base. The mechanisms receive a portion of natural language content from the knowledge base. The mechanisms generate a graph data structure representing a selected concept present in portion of the natural language content within a knowledge base, where nodes of the graph data structure represent a canonical name for the selected concept and a set of synonyms identified from a knowledge base as being associated with the canonical name and edges represent relationships between the canonical name and the set of synonyms identified from a knowledge base as being associated with the canonical name. The mechanisms analyze the graph data structure to determine whether or not the graph data structure comprises one or more concept conflicts in association with a node in the graph data structure, where the one or more concept conflicts are associated with the selected concept if at least two nodes in the graph data structure represent separate distinct concepts. Responsive to determining that there are one or more concept conflicts due to there being separate distinct concepts associated with the selected concept, the mechanisms split the selected concept into separate distinct concepts within the knowledge base.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system comprising at least one processor and at least one memory, the at least one memory comprising instructions executed by the at least one processor to cause the at least one processor to implement natural language processing (NLP) system, wherein the method comprises:
   receiving, by the NLP system, a portion of natural language content related to a selected concept from a knowledge base;
   generating, by the NLP system, a graph data structure representing the concept present in the portion of the natural language content, wherein nodes of the graph data structure comprise a first node representing a name of the concept and a one or more other nodes representing synonyms associated with the first node and wherein the graph data structure further indicates relationships between the first node and the one or more other nodes based on a similarity measure of the other nodes to the first node;
   analyzing, by the NLP system, the graph data structure to determine whether or not the graph data structure comprises one or more concept conflicts in association with a set of nodes in the graph data structure, wherein the one or more concept conflicts are associated with the set of nodes responsive to two or more nodes representing separate and distinct concepts; and
   responsive to determining that there are one or more concept conflicts due to there being two or more nodes representing separate and distinct concepts, splitting, by the NLP system, the two or more nodes into separate distinct concepts within the knowledge base.

2. The method of claim 1, wherein analyzing the graph data structure comprises:
   automatically generating, by the NLP system, a first cluster of nodes including the first node and one or more other nodes associated with the first node; and storing, by the NLP system, in the knowledge base, the first cluster of nodes in association with a first separate distinct concept.

3. The method of claim 2, wherein automatically generating the cluster comprises:
assigning, by the NLP system, other nodes, in the one or more other nodes, to the first cluster of nodes associated with the first node based on the similarity measure of the other nodes to the first node.

4. The method of claim 3, wherein the similarity measure is a cosine similarity or a Euclidean distance.

5. The method of claim 1, wherein analyzing the graph data structure comprises:
identifying, by the NLP system, a second node in the graph data structure, wherein the second node is a node that has one or more other nodes connected to the second node by an edge in the graph and has a relatively high visiting probability;
automatically generating, by the NLP system, a second cluster of nodes including the second node and one or more other nodes associated with the second node; and
storing, by the NLP system, in the knowledge base, the second cluster of nodes in association with a second separate distinct concept.

6. The method of claim 5, wherein identifying the second canonical concept node in the graph comprises:
calculating, by the NLP system, for each node in the graph, a visiting probability indicating a probability that the concept associated with the node will be used by a cognitive system to perform a cognitive operation; and
selecting, by the NLP system, a node having a largest visiting probability as the first node.

7. The method of claim 5, wherein automatically generating the cluster comprises:
assigning, by the NLP system, other nodes, in the one or more other nodes, to the second cluster of nodes associated with the second node based on a distance of the other nodes to the second node.

8. The method of claim 7, wherein the similarity measure is a cosine similarity or a Euclidean distance.

9. A computer program product comprising a computer readable storage medium having a computer readable program stored therein, wherein the computer readable program, when executed on a computing device, causes the computing device to implement a natural language processing (NLP) system which operates to:
receive a portion of natural language content related to a selected concept from a knowledge base;
generate a graph data structure representing the concept present in the portion of the natural language content, wherein nodes of the graph data structure comprise a first node representing a name of the concept and a one or more other nodes representing synonyms associated with the first node and wherein the graph data structure further indicates relationships between the first node and the one or more other nodes based on a similarity measure of the other nodes to the first node;
analyze the graph data structure to determine whether or not the graph data structure comprises one or more concept conflicts in association with a set of nodes in the graph data structure, wherein the one or more concept conflicts are associated with the set of nodes responsive to two or more nodes representing separate and distinct concepts; and
responsive to determining that there are one or more concept conflicts due to there being two or more nodes representing separate and distinct concepts, split the two or more nodes into separate distinct concepts within the knowledge base.

10. The computer program product of claim 9, wherein the computer readable program to analyze the graph data structure further causes the computing device to implement the NLP system which operates to:
automatically generate a first cluster of nodes including the first node and one or more other nodes associated with the first node; and
store, in the knowledge base, the first cluster of nodes in association with a first separate distinct concept.

11. The computer program product of claim 10, wherein the computer readable program to automatically generate the cluster further causes the computing device to implement the NLP system which operates to:
assign other nodes, in the one or more other nodes, to the first cluster of nodes associated with the first node based on the similarity measure of the other nodes to the first node.

12. The computer program product of claim 9, wherein the computer readable program to analyze the graph data structure further causes the computing device to implement the NLP system which operates to:
identify a second node in the graph data structure, wherein the second node is a node that has one or more other nodes connected to the second node by an edge in the graph and has a relatively high visiting probability;
automatically generate a second cluster of nodes including the second node and one or more other nodes associated with the second node; and
store in the knowledge base, the second cluster of nodes in association with a second separate distinct concept.

13. The computer program product of claim 12, wherein the computer readable program to identify the second canonical concept node in the graph further causes the computing device to implement the NLP system which operates to:
calculate for each node in the graph, a visiting probability indicating a probability that the concept associated with the node will be used by a cognitive system to perform a cognitive operation; and
select a node having a largest visiting probability as the first node.

14. The computer program product of claim 12, wherein the computer readable program to automatically generate the cluster further causes the computing device to implement the NLP system which operates to:
assign other nodes, in the one or more other nodes, to the second cluster of nodes associated with the second node based on a distance of the other nodes to the second node.

15. An apparatus comprising:
a processor; and
a memory coupled to the processor, wherein the memory comprises instructions which, when executed by the processor, cause the processor to implement a natural language processing (NLP) system which operates to:
receive a portion of natural language content related to a selected concept from a knowledge base;
generate a graph data structure representing the concept present in the portion of the natural language content, wherein nodes of the graph data structure comprise a first node representing a name of the concept and a one or more other nodes representing synonyms associated with the first node and wherein the graph data structure further indicates relationships between the first node and the one or more other nodes based on a similarity measure of the other nodes to the first node;

analyze the graph data structure to determine whether or not the graph data structure comprises one or more concept conflicts in association with a set of nodes in the graph data structure, wherein the one or more concept conflicts are associated with the set of nodes responsive to two or more nodes representing separate and distinct concepts; and responsive to determining that there are one or more concept conflicts due to there being two or more nodes representing separate and distinct concepts, split the two or more nodes into separate distinct concepts within the knowledge base.

16. The apparatus of claim 15, wherein the instructions to analyze the graph data structure further cause the processor to implement the NLP system which operates to:

automatically generate a first cluster of nodes including the first node and one or more other nodes associated with the first node; and store, in the knowledge base, the first cluster of nodes in association with a first separate distinct concept.

17. The apparatus of claim 16, wherein the instructions to automatically generate the cluster further cause the processor to implement the NLP system which operates to:

assign other nodes, in the one or more other nodes, to the first cluster of nodes associated with the first node based on the similarity measure of the other nodes to the first node.

18. The apparatus of claim 15, wherein the instructions to analyze the graph data structure further cause the processor to implement the NLP system which operates to:

identify a second node in the graph data structure, wherein the second node is a node that has one or more other nodes connected to the second node by an edge in the graph and has a relatively high visiting probability;

automatically generate a second cluster of nodes including the second node and one or more other nodes associated with the second node; and store in the knowledge base, the second cluster of nodes in association with a second separate distinct concept.

19. The apparatus of claim 18, wherein the instructions to identify the second canonical concept node in the graph further cause the processor to implement the NLP system which operates to:

calculate for each node in the graph, a visiting probability indicating a probability that the concept associated with the node will be used by a cognitive system to perform a cognitive operation; and select a node having a largest visiting probability as the first node.

20. The apparatus of claim 18, wherein the instructions to automatically generate the cluster further cause the processor to implement the NLP system which operates to:

assign other nodes, in the one or more other nodes, to the second cluster of nodes associated with the second node based on a distance of the other nodes to the second node.

* * * * *